United States Patent
Jarrami et al.

(10) Patent No.: US 11,031,046 B2
(45) Date of Patent: Jun. 8, 2021

(54) DISK-SHAPED ARTICLE SHIPPING CONTAINER

(71) Applicant: Western Digital Technologies, Inc., Irvine, CA (US)

(72) Inventors: Tony Jarrami, Saratoga, CA (US); David Lenguyen, San Jose, CA (US); Andreas Parks, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 41 days.

(21) Appl. No.: 16/295,981

(22) Filed: Mar. 7, 2019

(65) Prior Publication Data
US 2020/0219541 A1 Jul. 9, 2020

Related U.S. Application Data

(60) Provisional application No. 62/788,828, filed on Jan. 5, 2019.

(51) Int. Cl.
*B65D 85/48* (2006.01)
*G11B 33/04* (2006.01)
(Continued)

(52) U.S. Cl.
CPC .......... *G11B 33/0444* (2013.01); *B65D 11/02* (2013.01); *G11B 33/025* (2013.01)

(58) Field of Classification Search
CPC .... B65D 11/02; B65D 85/30; G11B 33/0444; G11B 33/0472; G11B 33/025;
(Continued)

(56) References Cited

U.S. PATENT DOCUMENTS

| 4,520,925 A | * | 6/1985 | Johnson | B65D 25/107 |
| | | | | 206/454 |
| 5,046,615 A | * | 9/1991 | Nentl | G11B 33/0444 |
| | | | | 206/454 |

(Continued)

FOREIGN PATENT DOCUMENTS

CN 1163675 A 10/1997
CN 1454827 A 11/2003
(Continued)

OTHER PUBLICATIONS

Examination Search Report dated Mar. 1, 2021 in SG Patent Application No. 10201911921Q, 8 pages.

*Primary Examiner* — Luan K Bui
(74) *Attorney, Agent, or Firm* — Kunzler Bean & Adamson

(57) ABSTRACT

Disclosed herein is a container for shipping disk-shaped articles. The container comprises a cassette comprising a top opening, a plurality of dividers that define slots therebetween for receiving disk-shaped articles and constraining lateral movement of the disk-shaped articles, and pads for supporting the disk-shaped articles and constraining downward vertical movement of the disk-shaped articles. The container also comprises a top lid coupleable to the cassette over the top opening and comprising resiliently flexible fins. When the top lid is fully coupled to the cassette, the disk-shaped articles are supported on the pads, and the container is not shrink-wrapped, an unoccupied gap is defined between the resiliently flexible fins and the disk-shaped articles. When the top lid is fully coupled to the cassette, the disk-shaped articles are supported on the pads, and the container is shrink-wrapped, the resiliently flexible fins contact and are flexed against the disk-shaped articles.

20 Claims, 8 Drawing Sheets

(51) Int. Cl.
*B65D 8/00* (2006.01)
*G11B 33/02* (2006.01)

(58) Field of Classification Search
CPC ......... H01L 21/67363; H01L 21/67369; B65B 7/167; B65B 55/20
USPC ............... 206/303, 454, 497, 710, 711, 832; 53/467, 472
See application file for complete search history.

(56) References Cited

U.S. PATENT DOCUMENTS

| | | | |
|---|---|---|---|
| 5,273,159 A * | 12/1993 | Gregerson | H01L 21/67369 206/711 |
| 5,775,508 A * | 7/1998 | Bongard | B65D 25/107 206/454 |
| 5,842,575 A | 12/1998 | Dressen et al. | |
| 6,070,730 A | 6/2000 | Narisawa et al. | |
| 6,364,922 B1 * | 4/2002 | Tanaka | H01L 21/67393 206/710 |
| 6,994,217 B2 | 2/2006 | Duban-hu et al. | |
| 7,748,539 B2 * | 7/2010 | Onda | H01L 21/67369 206/591 |
| 8,851,291 B2 | 10/2014 | Haggard | |
| 9,117,863 B1 | 8/2015 | Dougherty et al. | |
| 9,142,260 B2 | 9/2015 | Anderson et al. | |
| 2003/0024887 A1 * | 2/2003 | Dunford | G11B 33/0444 211/41.18 |
| 2003/0205501 A1 * | 11/2003 | Hachtmann | G11B 33/0444 206/711 |
| 2005/0006325 A1 * | 1/2005 | Hua | H01L 21/67326 211/41.18 |
| 2006/0042998 A1 * | 3/2006 | Haggard | H01L 21/67369 206/711 |
| 2006/0108242 A1 | 5/2006 | Christensen et al. | |
| 2010/0020440 A1 | 1/2010 | Stasieluk | |

FOREIGN PATENT DOCUMENTS

| | | |
|---|---|---|
| CN | 201033652 Y | 3/2008 |
| CN | 207417448 | 5/2018 |
| JP | H07161805 A | 6/1995 |
| JP | H10189705 A | 7/1998 |
| JP | H10264984 A | 10/1998 |
| JP | 2013511791 A | 4/2013 |
| JP | 2013157374 A | 8/2013 |
| WO | 2007063844 A1 | 6/2007 |
| WO | 2009099027 A1 | 8/2009 |
| WO | 2011063118 A2 | 5/2011 |

* cited by examiner

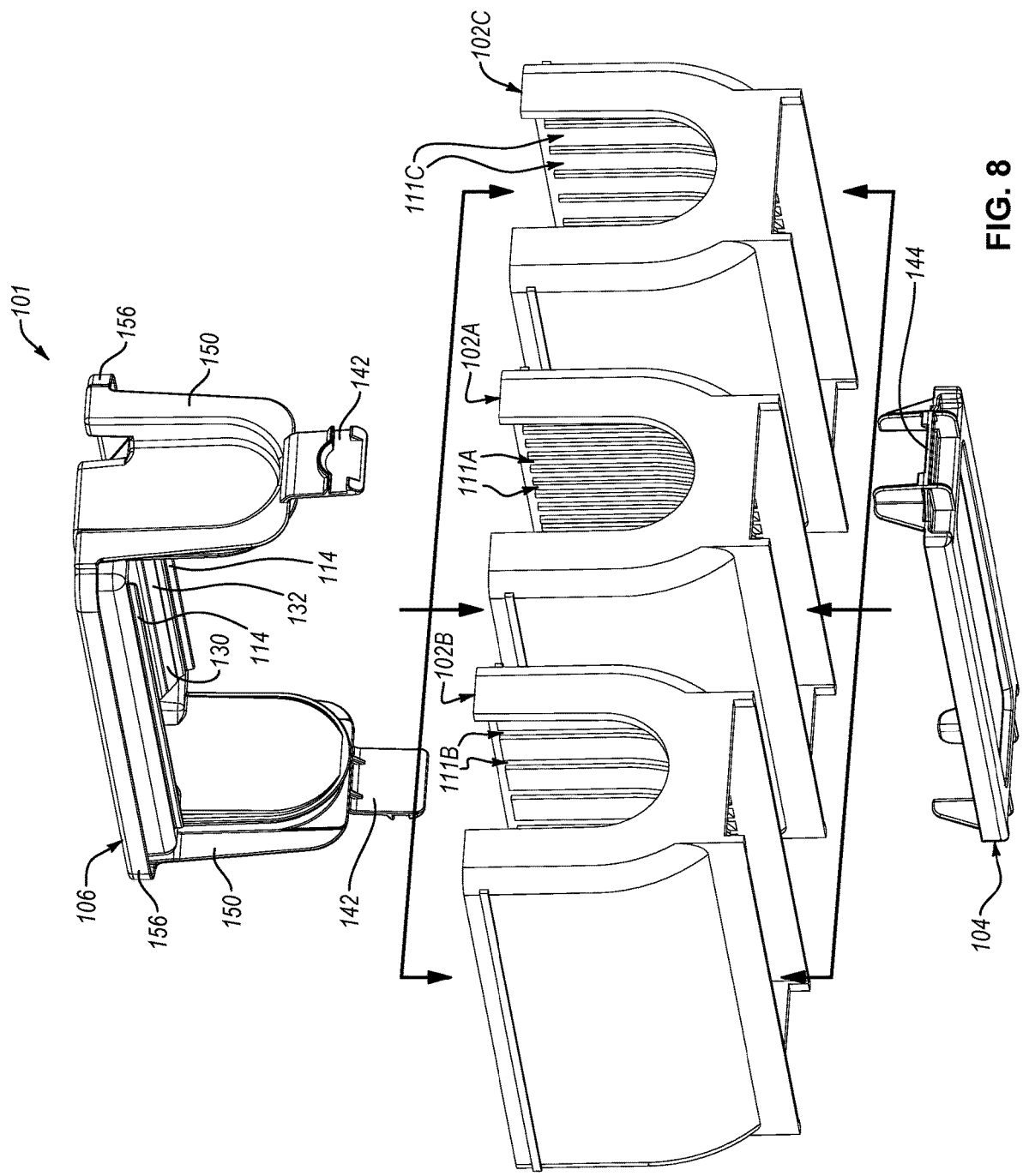

DISK-SHAPED ARTICLE SHIPPING CONTAINER

CROSS-REFERENCE TO RELATED APPLICATION

This application claims the benefit of U.S. Provisional Patent Application No. 62/788,828, filed Jan. 5, 2019, which is incorporated herein by reference.

FIELD

This application is related generally to manufacturing of disk-shaped articles, and more particularly to shipping disk-shaped articles in containers from one location to another location.

BACKGROUND

Disk-shaped articles, such as hard disk drive (HDD) media for use in hard disk drives, are often manufactured at one location and assembled into an assembly, such as a hard disk drive at another, sometimes remote, location. Accordingly, disk-shaped articles are often shipped or transported from one location to another location. Because some disk-shaped articles, including HDD media, are sensitive to abrasions and contamination, the disk-shaped articles should be securely retained in an abrasion-resistant container for shipping. However, conventional containers, configured to secure, immobilize, and protect disk-shaped articles during transportation between and storage at different locations, still generate some abrasive wear to and contamination of the disk-shaped articles.

SUMMARY

The subject matter of the present application has been developed in response to the present state of the art, and in particular, in response to the problems and needs associated with storing and shipping disk-shaped articles, such as hard disk drive (HDD) media, in containers, such as prior to installation of the media in HDDs. Conventional containers, configured to secure, immobilize, and protect disk-shaped articles during transportation between and storage at different locations, tend to abrasively wear and contaminate the disk-shaped articles. In view of the foregoing, the subject matter of the present application has been developed to provide a shipping container that overcomes many of the shortcomings of the prior art by reducing abrasive wear and contamination of the disk-shaped articles during transportation and storage.

Disclosed herein is a container for shipping disk-shaped articles. The container comprises a cassette. The cassette comprises a top opening. The cassette also comprises a plurality of dividers that define slots therebetween for receiving disk-shaped articles and constraining lateral movement of the disk-shaped articles. The cassette further comprises pads for supporting the disk-shaped articles and constraining downward vertical movement of the disk-shaped articles. The container also comprises a top lid coupleable to the cassette over the top opening and comprising resiliently flexible fins. When the top lid is fully coupled to the cassette, the disk-shaped articles are supported on the pads, and the container is not shrink-wrapped, an unoccupied gap is defined between the resiliently flexible fins and the disk-shaped articles. When the top lid is fully coupled to the cassette, the disk-shaped articles are supported on the pads, and the container is shrink-wrapped, the resiliently flexible fins contact and are flexed against the disk-shaped articles. The preceding subject matter of this paragraph characterizes example 1 of the present disclosure.

The resiliently flexible fins comprise a first resiliently flexible fin aligned with a first side of the disk-shaped articles received in the cassette and a second resiliently flexible fin aligned with a second side, opposite the first side, of the disk-shaped articles received in the cassette. The preceding subject matter of this paragraph characterizes example 2 of the present disclosure, wherein example 2 also includes the subject matter according to example 1, above.

When the top lid is coupled to the cassette, each one of the resiliently flexible fins transverses multiple ones of the slots. The preceding subject matter of this paragraph characterizes example 3 of the present disclosure, wherein example 3 also includes the subject matter according to any one of examples 1-2, above.

The unoccupied gap has a thickness between 0.2 mm and 1.0 mm. The preceding subject matter of this paragraph characterizes example 4 of the present disclosure, wherein example 4 also includes the subject matter according to any one of examples 1-3, above.

The cassette further comprises a bottom opening. The container further comprises a bottom lid coupleable to the cassette over the bottom opening. When the top lid and the bottom lid are coupled to the cassette, the bottom lid is interlockable with the top lid. The preceding subject matter of this paragraph characterizes example 5 of the present disclosure, wherein example 5 also includes the subject matter according to any one of examples 1-4, above.

The top lid is fully coupled to the cassette when the bottom lid is coupled to the cassette, the top lid is coupled to the cassette, and the bottom lid and the top lid are interlocked. The preceding subject matter of this paragraph characterizes example 6 of the present disclosure, wherein example 6 also includes the subject matter according to example 5, above.

The top lid further comprises vertical-containment walls. When the top lid is fully coupled to the cassette, the disk-shaped articles are supported on the pads, and the container is not shrink-wrapped, a second unoccupied gap is defined between the vertical-containment walls and the disk-shaped articles. When the top lid is fully coupled to the cassette, the disk-shaped articles are supported on the pads, and the container is shrink-wrapped, the vertical-containment walls contact the disk-shaped articles. The preceding subject matter of this paragraph characterizes example 7 of the present disclosure, wherein example 7 also includes the subject matter according to any one of examples 1-6, above.

The vertical-containment walls comprise a first vertical-containment wall aligned with a first side of the disk-shaped articles received in the cassette and a second vertical-containment wall aligned with a second side, opposite the first side, of the disk-shaped articles received in the cassette. The preceding subject matter of this paragraph characterizes example 8 of the present disclosure, wherein example 8 also includes the subject matter according to example 7, above.

When the top lid is coupled to the cassette, each one of vertical-containment walls transverses multiple ones of the slots. The preceding subject matter of this paragraph characterizes example 9 of the present disclosure, wherein example 9 also includes the subject matter according to any one of examples 7-8, above.

The second unoccupied gap has a thickness between 0.2 mm and 1.0 mm. The preceding subject matter of this paragraph characterizes example 10 of the present disclosure, wherein example 10 also includes the subject matter according to any one of examples 7-9, above.

The top lid does not constrain lateral movement of the disk-shaped articles. The preceding subject matter of this paragraph characterizes example 11 of the present disclosure, wherein example 11 also includes the subject matter according to any one of examples 1-10, above.

Further disclosed herein is a method of shipping disk-shaped articles. The method comprises locating disk-shaped articles in a cassette within slots, defined between a plurality of dividers of the cassette, and on pads of the cassette. The method also comprises fully coupling a top lid to the cassette such that a gap is defined between each one of resiliently flexible fins of the top lid and the disk-shaped articles when the disk-shaped articles are located on the pads of the cassette. The method further comprises, with the top lid fully coupled to the cassette, shrink-wrapping the cassette and the top lid with shrink-wrap material to reduce the gap and urge the resiliently flexible fins of the top lid into contact with the disk-shaped articles. The preceding subject matter of this paragraph characterizes example 12 of the present disclosure.

Shrink-wrapping the cassette and the top lid comprises enveloping the cassette and the top lid with the shrink-wrap material and reducing a pressure within the shrink-wrap material by at least 10% to 15%. The preceding subject matter of this paragraph characterizes example 13 of the present disclosure, wherein example 13 also includes the subject matter according to example 12, above.

Fully coupling the top lid to the cassette further comprises fully coupling the top lid to the cassette such that a second gap is defined between each one of vertical-containment walls of the top lid and the disk-shaped articles when the disk-shaped articles are located on the pads of the cassette. Shrink-wrapping the cassette and the top lid reduces the second gap and urges the vertical-containment walls into contact with the disk-shaped articles. The preceding subject matter of this paragraph characterizes example 14 of the present disclosure, wherein example 14 also includes the subject matter according to any one of examples 12-13, above.

The method further comprises coupling a bottom lid to the cassette and interlocking the top lid and the bottom lid. Shrink-wrapping further comprises shrink-wrapping the cassette, the top lid, and the bottom lid with shrink-wrap material. The preceding subject matter of this paragraph characterizes example 15 of the present disclosure, wherein example 15 also includes the subject matter according to any one of examples 12-14, above.

The method further comprises removing the shrink-wrap material from the cassette and the top lid. The method also comprises decoupling the top lid from the cassette. The method additionally comprises decoupling the top lid from the cassette. The method also comprises locating second disk-shaped articles in a second cassette within second slots, defined between a plurality of second dividers of the second cassette, and on second pads of the second cassette, where the second cassette is configured differently than the cassette. The method further comprises fully coupling the top lid to the second cassette such that a second gap is defined between each one of resiliently flexible fins of the top lid and the second disk-shaped articles when the second disk-shaped articles are located on the second pads of the second cassette. The method additionally comprises, with the top lid fully coupled to the second cassette, shrink-wrapping the second cassette and the top lid with shrink-wrap material to reduce the second gap and urge the resiliently flexible fins of the top lid into contact with the second disk-shaped articles. The preceding subject matter of this paragraph characterizes example 16 of the present disclosure, wherein example 16 also includes the subject matter according to any one of examples 12-15, above.

At least one of the size of the second slots is different than that of the slots or the number of second slots is different than that of the slots. The preceding subject matter of this paragraph characterizes example 17 of the present disclosure, wherein example 17 also includes the subject matter according to example 16, above.

Additionally described herein is a system for shipping disk-shaped articles. The system comprises a plurality of cassettes, each comprising a top opening, a plurality of dividers that define slots therebetween for receiving disk-shaped articles and constraining lateral movement of the disk-shaped articles, and pads for supporting the disk-shaped articles and constraining downward vertical movement of the disk-shaped articles. Each one of the plurality of cassettes is configured differently than any other of the plurality of cassettes. The system also comprises a top lid interchangeably coupleable to each one of the plurality of cassettes over the top opening and comprising resiliently flexible fins. When the top lid is fully coupled to any one of the plurality of cassettes, the disk-shaped articles are supported on the pads, and the container is not shrink-wrapped, an unoccupied gap is defined between the resiliently flexible fins and the disk-shaped articles. When the top lid is fully coupled to any one of the cassettes, the disk-shaped articles are supported on the pads, and the container is shrink-wrapped, the resiliently flexible fins contact and are flexed against the disk-shaped articles. The preceding subject matter of this paragraph characterizes example 18 of the present disclosure.

At least one of (i) a size of the slots of any one of the plurality of cassettes is different than the size of the slots of any other of the plurality of cassettes, or (ii) a total number of the slots of any one of the plurality of cassettes is different than the total number of the slots of any other of the plurality of cassettes. The preceding subject matter of this paragraph characterizes example 19 of the present disclosure, wherein example 19 also includes the subject matter according to example 18, above.

The system further comprises a bottom lid. Each one of the plurality of cassettes further comprises a bottom opening. The bottom lid is interchangeably coupleable to each one of the plurality of cassettes over the bottom opening. When the top lid and the bottom lid are coupled to a same one of the plurality of cassettes, the bottom lid is interlockable with the top lid. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 8 is a perspective view of a system for shipping HDD media, according to one or more examples of the present disclosure.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Embodiments of the subject matter of the present disclosure are applicable to disk-shaped articles, such as hard disk drive (HDD) media, optical discs, wafers, substrates, and the like. For the sake of simplicity of description, the examples in this disclosure are described with respect to HDD media, but are equally applicable to other disk-shaped articles. In other words, unless otherwise noted, references to HDD media can be interchanged with other disk-shaped articles.

Figure 1:
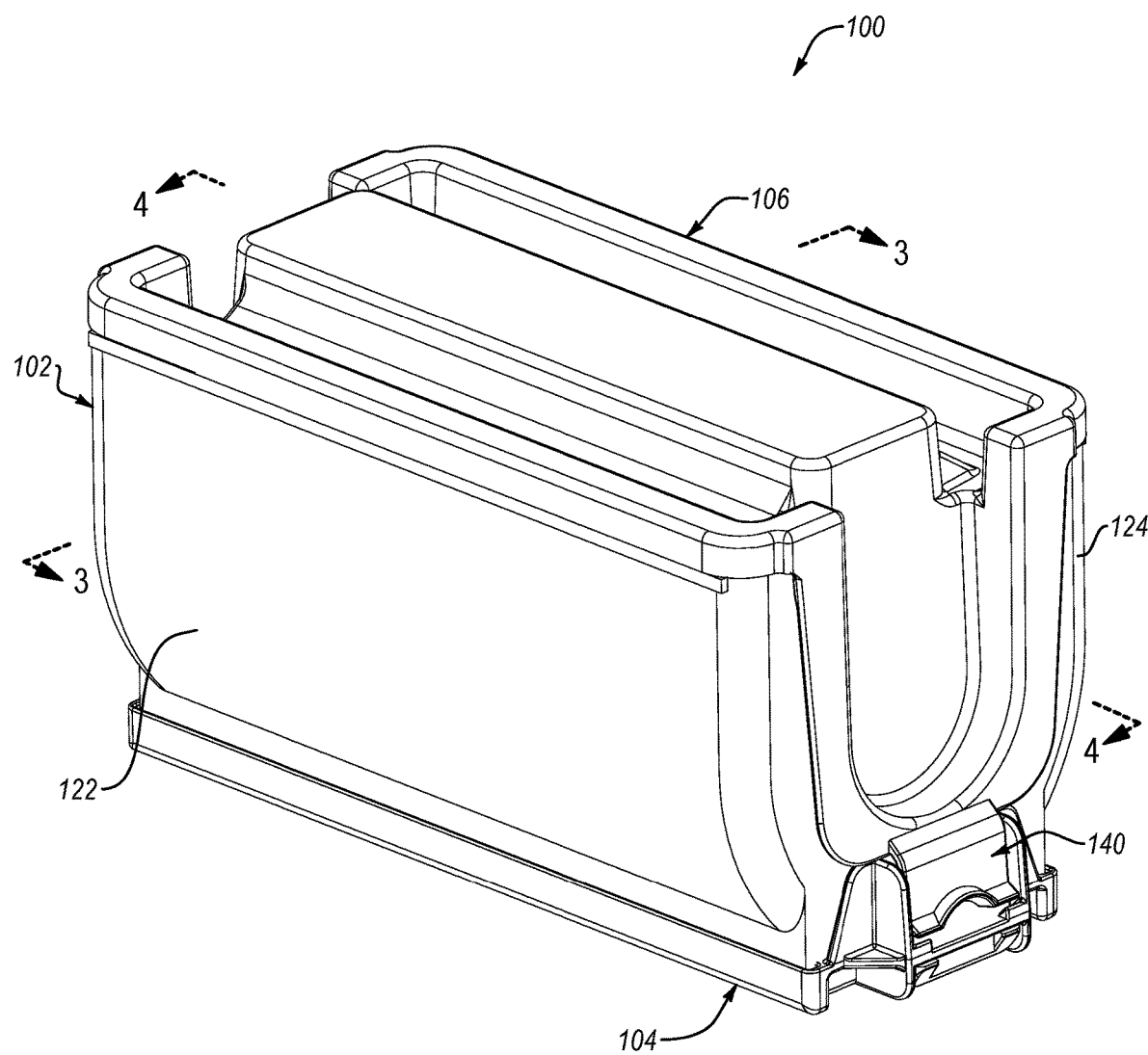
FIG. 1 is a perspective view of a container for shipping hard disk drive (HDD) media, according to one or more examples of the present disclosure.
Figure 2:
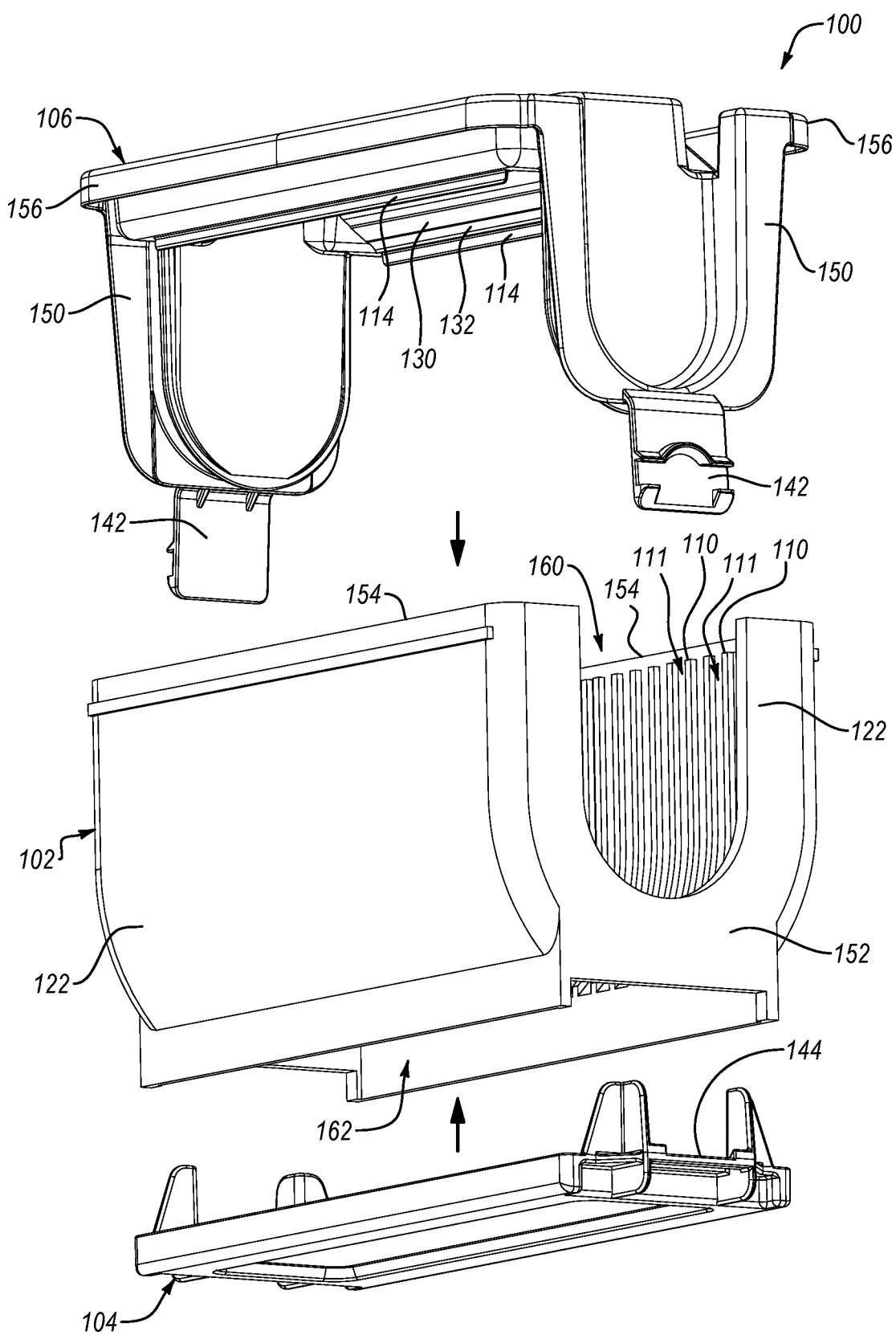
FIG. 2 is an exploded perspective view of the container of FIG. 1, according to one or more examples of the present disclosure.
Figure 7:
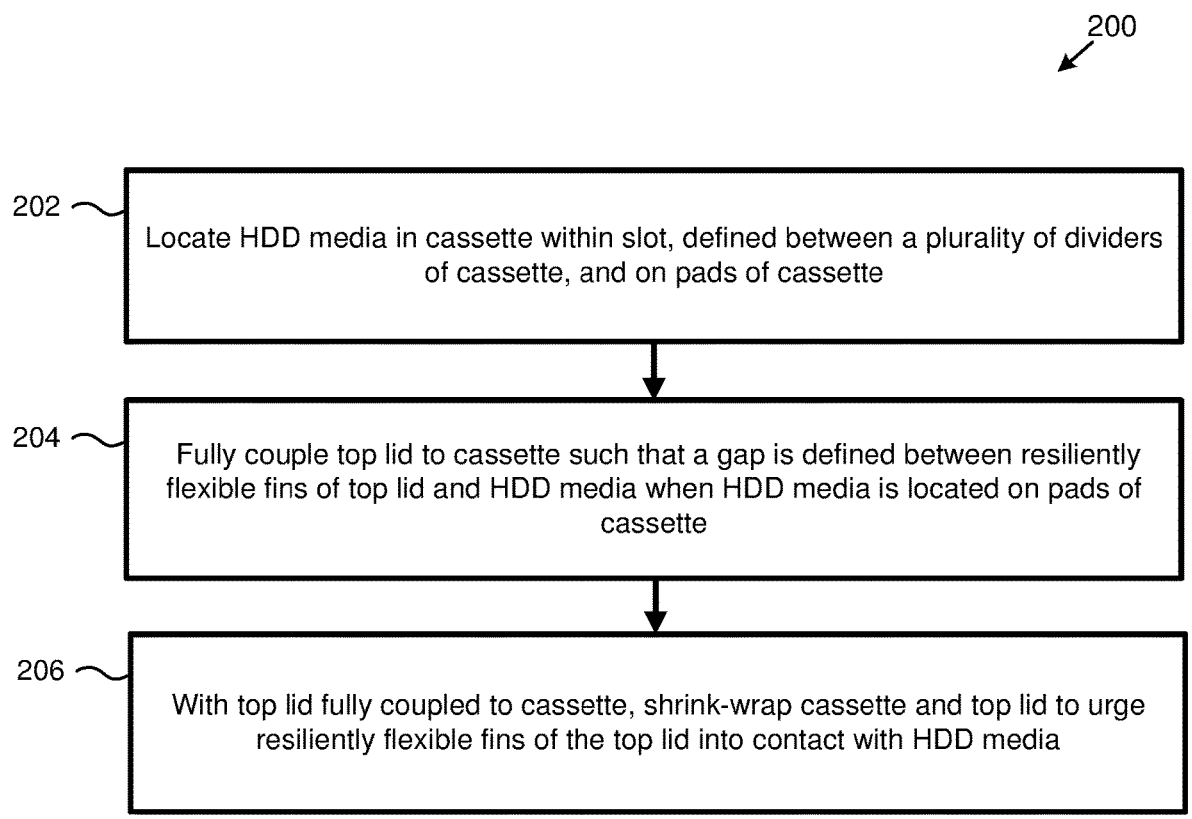
FIG. 7 is a schematic flow chart of a method of shipping HDD media, according to one or more examples of the present disclosure.

Referring to FIGS. 1 and 2, disclosed herein is a container 100 for shipping hard disk drive (HDD) media, according to some examples. As used herein, HDD media 108 can be one disk or medium or multiple disks or media. Generally, each disk of the HDD media 108 is a circular disk, which is defined as a thin wafer-like structure with a circular-shaped outer periphery or edge. The container 100 is configured to secure, immobilize, and protect multiple HDD media (e.g., disks) during transportation between and storage at different locations. In certain implementations, HDD media are manufactured at one facility and assembled into an HDD at another, remotely located, facility. The container 100 helps to store and protect the HDD media as they are shipped (i.e., transported) from one facility to another facility. Referring to FIG. 7, after HDD media are installed in the container 100, the container 100 is shrink-wrapped to promote secure containment of the HDD media by the container 100. In some examples, the HDD media are magnetic storage disks.

The container 100 includes a cassette 102 (or main body) and a top lid 106 releasably coupleable to the cassette 102. When releasably coupled to the cassette 102, the top lid 106 covers a top opening 160 and open ends 152 of the cassette 102. In some examples, the container 100 further includes a bottom lid 104 that is releasably coupleable to the cassette 102. When releasably coupled to the cassette 102, the bottom lid 104 covers a bottom opening 162 of the cassette 102. The top lid 106 and the bottom lid 104 may include any of various features associated with the functionality of the container 100, such as features that aid in the handling and shipping of the container 100.

The top lid 106 includes first interlocking features 142 and the bottom lid 104 includes second interlocking features 144. Each of the first interlocking features 142 of the top lid 106 is configured to interlock with a corresponding one of the second interlocking features 144 of the bottom lid 104. Coupling the top lid 106 and the bottom lid 104 to the cassette 102 and interlocking the first interlocking features 142 and the second interlocking features 144 secures the cassette 102 between the top lid 106 and the bottom lid 104. In some implementations, interlocking the first interlocking features 142 and the second interlocking features 144 results in the top lid 106 and the bottom lid 104 applying opposing compressive forces to the cassette to in effect clamp or sandwich the cassette 102 between the top lid 106 and the bottom lid 104. The first interlocking features 142 and the second interlocking features 144 can include any of various interlocking couplers, such as clips, buckles, detents, and the like. In some examples, the bottom lid 104 is integrated into the cassette 102 to form a one-piece, continuous, and monolithic structure with the cassette 102.

The cassette 102 includes a first sidewall 122, a second sidewall 124, and a media storage space 120 defined between the first sidewall 122 and the second sidewall 124. The first sidewall 122 is opposite and mirrors the second sidewall 124. The first sidewall 122 and the second sidewall 124 are shaped such that the media storage space 120 has a cross-sectional shape corresponding with HDD media 108 (see, e.g., FIG. 5). The cross-sectional shape of the media storage space 120 is substantially curved at a bottom portion of the cassette 102 to complement the curvature of the HDD media 108. A maximum horizontal dimension of the media storage space 120 is greater than a diameter of the HDD media 108 such that the HDD media 108 is able to fit within the cassette 102.

Figure 3:
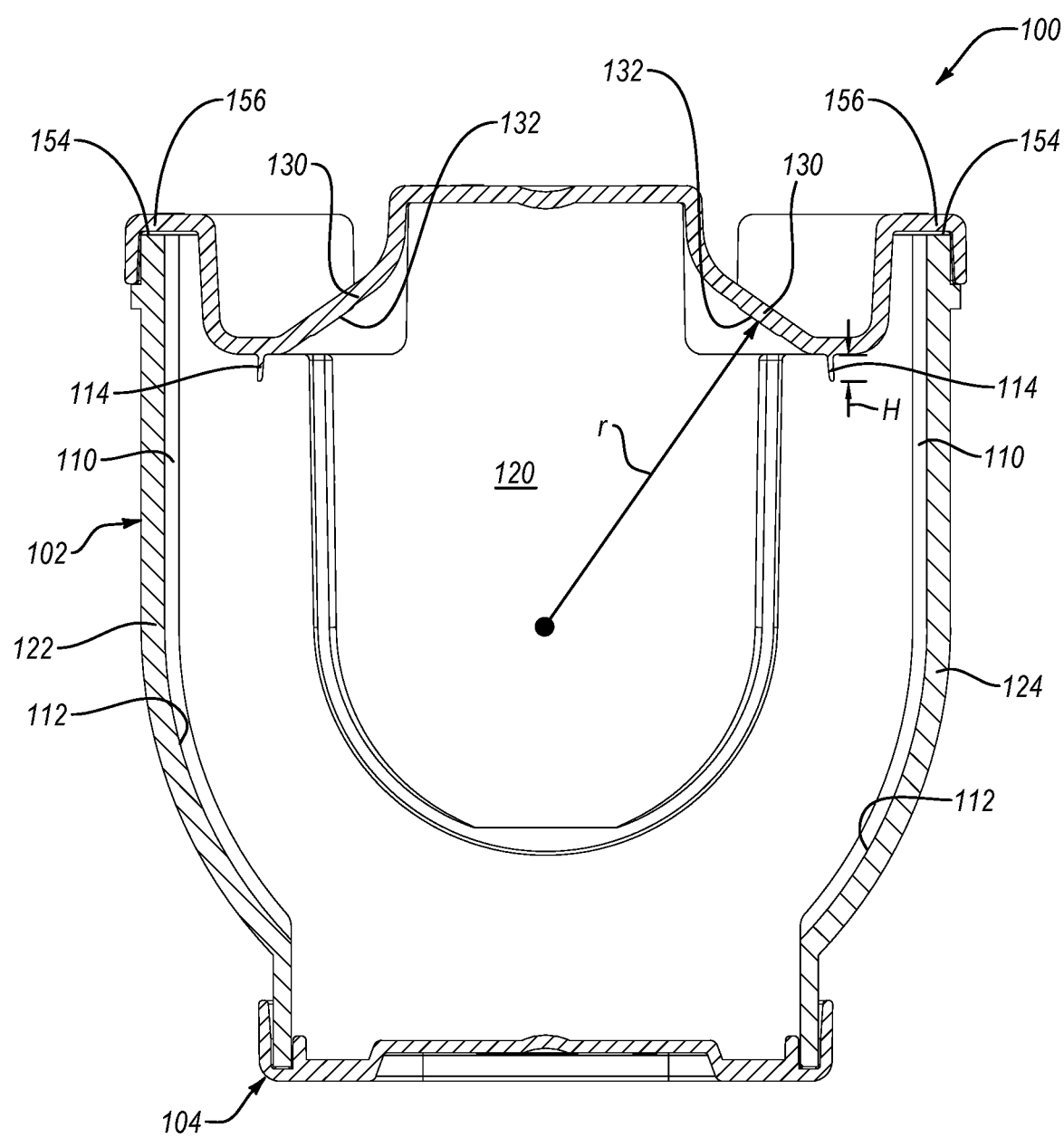
FIG. 3 is a cross-sectional side elevation view of the container of FIG. 1, taken along the line 3-3 of FIG. 1, according to one or more examples of the present disclosure.
Figure 4:
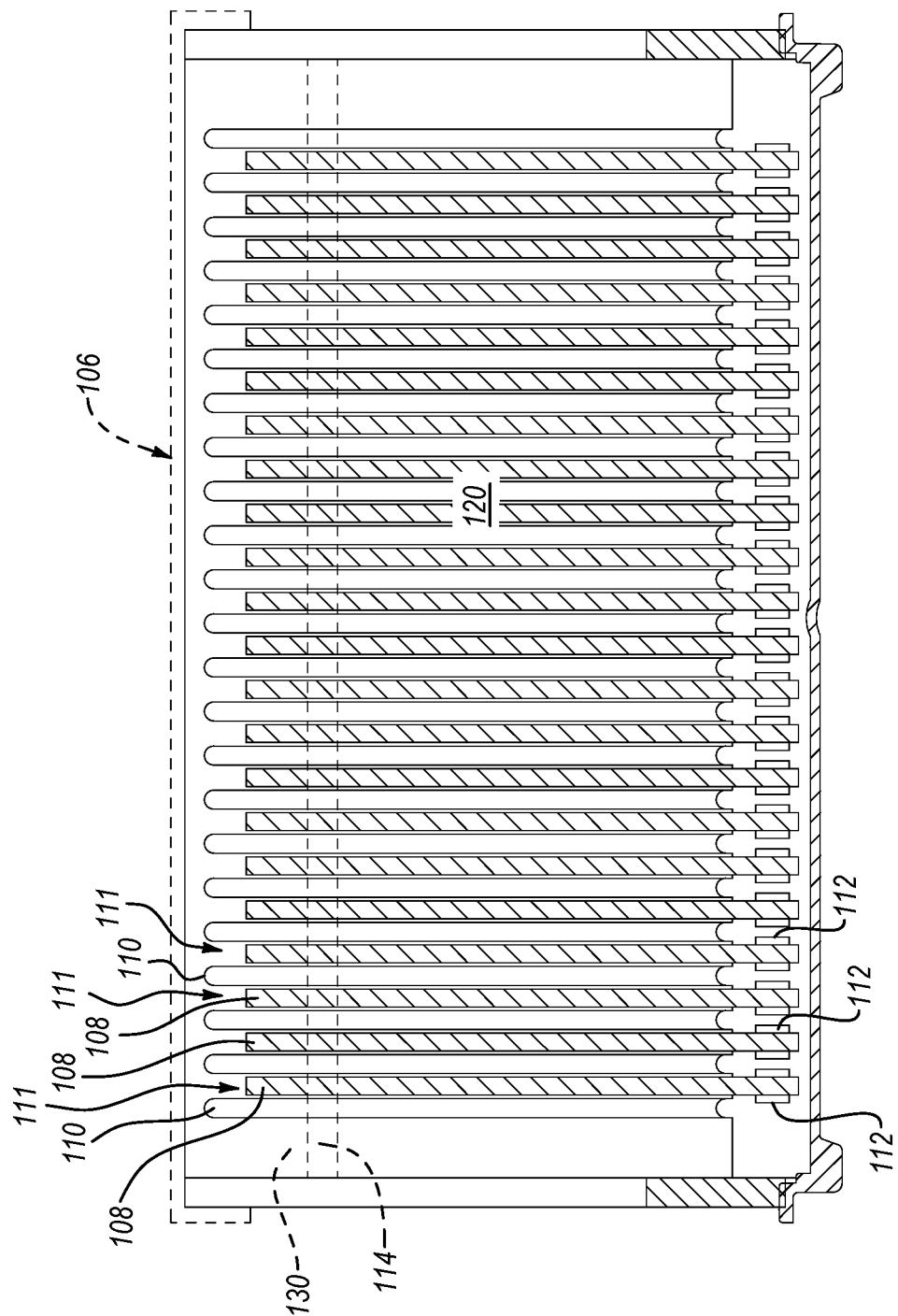
FIG. 4 is a cross-sectional front elevation view of the container of FIG. 1, taken along the line 4-4 of FIG. 1, according to one or more examples of the present disclosure.

Referring to FIGS. 2-4, the cassette 102 further includes dividers 110 protruding from each of the first sidewall 122 and the second sidewall 124 into the media storage space 120. For every divider 110 on the first sidewall 122 there is a corresponding divider 110 on the second sidewall 124 that is aligned, across the media storage space 120, with the divider 110 on the first sidewall 122. The dividers 110 extend vertically from a location proximate the top opening 160 of the cassette 102 to an intermediate location between the top opening 160 and the bottom opening 162 of the cassette 102. The dividers 110 on each of the first sidewall 122 and the second sidewall 124 are spaced apart from an adjacent one of the dividers 110, along a length of the cassette 102, by a distance corresponding to a width of each of the HDD media 108. Moreover, the dividers 110 sufficiently protrude into the media storage space 120 to define a distance between opposing dividers 110, on the first sidewall 122 and the second sidewall 124, that is less than a diameter of the HDD media 108. Accordingly, the space between adjacent dividers 110 defines a slot 111 into which the HDD media 108 can be inserted and laterally retained. In other words, the dividers 110, defining the slot 111, act as stops to constrain (e.g., prevent) lateral movement (e.g., movement parallel to the length of the cassette 102) of HDD media 108 inserted into the slot 111. The multiple dividers 110 of the cassette 102 define multiple slots 111 along the length of the cassette 102 such that the cassette 102 is capable of concurrently receiving and retaining multiple HDD media 108.

The cassette 102 additionally includes pads 112 protruding from the first sidewall 122 and the second sidewall 124 into the media storage space 120. Each of the pads 112 is vertically aligned with a corresponding slot 111 and is located between the dividers 110 and the bottom opening 162 of the cassette 102. The pads 112 are configured to receive and directly support the HDD media 108 within the media storage space 120. Each of the pads 112 includes a concave surface that has a curvature complementing the curvature of the outer circular perimeter of the HDD media 108. The pads 112 can be co-formed with and made of the same material as the first sidewall 122 and the second sidewall 124. Alternatively, the pads 112 can be separately formed and attached to interior surfaces of the first sidewall 122 and the second sidewall 124 and be made of a material different than (e.g., softer than) the first sidewall 122 and the second sidewall 124. The pads 112 help to constrain downward vertical movement of the HDD media 108 when contained within the cassette 102. In some examples, each of the first sidewall 122 and the second sidewall 124 includes multiple pads 112 each aligned with a corresponding one of the slots 111. However, in other examples, each of the first sidewall 122 and the second sidewall 124 includes a single pad 112 that extends lengthwise along the cassette 102 to transverse multiple slots 111.

As presented above, the top of the cassette 102 is open to allow HDD media 108 to be inserted into respective slots 111 of the cassette 102 within the media storage space 120. After the HDD media 108 is inserted into the cassette 102, the top opening 160 of the cassette 102 is closed with the top lid 106 of the container 100. In some examples, the top lid 106 is shaped to complement the shape of the HDD media 108 in order to reduce a form factor of the container 100.

Prior to shrink-wrapping the container 100 (as will be described in more detail below) and with the top lid 106 fully coupled to the top of the cassette 102, no portion of the top lid 106 is capable of being in contact with the HDD media 108 when the HDD media 108 is supported on the pads 112 within the slots 111. For example, contrary to some conventional shipping containers, the top lid 106 does not include teeth, protruding into the media storage space 120, for constraining lateral movement of the HDD media 108 when the top lid 106 is coupled to the cassette 102. In other words, the top lid 106 does not constrain lateral movement of the HDD media 108. Such teeth, as they come into contact with the HDD media, can cause wear on the HDD media 108 and generate particles as the container 100 is handled and shipped. Moreover, the inventors have observed that because the dividers 110 are able to adequately constrain lateral movement of the HDD media 108, teeth formed in the top lid 106, for laterally constraining movement of the HDD media 108, are not needed.

Additionally, as described below with reference to FIG. 8, without teeth, the top lid 106 can be used interchangeably with multiple cassettes 102 that are each configured to store different quantities of HDD media 108 or differently-sized HDD media 108 (e.g., HDD media 108 with different thicknesses). In some examples, the same top lid 106 can be used with cassettes 102 that store 97×0.635 mm disks and cassettes 102 that store 97×1.27 mm disks. Furthermore, as discussed above, the absence of teeth can reduce lid-media contact that causes media abrasion and generates particles.

According to some examples, when the top lid 106 is fully coupled to the top of the cassette 102, an uppermost rim 154 of the cassette 102 is greater than 0.40 mm away from the corresponding downward-facing engagement surface of the cassette engagement recess 156 of the top lid 106 (see, e.g., FIG. 3). In some examples, the top lid 106 is fully coupled to the top of the cassette 102 when the top lid 106 is coupled to the cassette 102, the bottom lid 104 is coupled to the cassette 102, and the top lid 106 and the bottom lid 104 are interlocked. In another embodiment, the material of the top lid 106 can be polycarbonate rather than the conventionally used polypropylene, to further reduce particle generation.

To help constrain upward vertical movement of the HDD media 108 when contained within the cassette 102 and after the container 100 is shrink-wrapped, the top lid 106 includes fins 114. The fins 114 protrude from the top lid 106 into the media storage space 120 a distance equal to a height H of the fins 114. The fins 114 are located on opposite sides of the top lid 106 so as to be aligned with opposite sides of the HDD media 108. The fins 114 are elongated and relatively thin in cross-section to allow for resilient flexing of the fins 114 under an applied pressure greater than the biasing force of the fins 114. Moreover, each one of the fins 114 is at least slightly angled away from vertical towards the corresponding one of the first sidewall 122 and the second sidewall 124 that is closest the fin 114. Such angling of the fins 114 allows the fins 114 to deflect outwardly toward the corresponding one of the first sidewall 122 and the second sidewall 124 when contacted by the HDD media 108 as described below.

Figure 5:
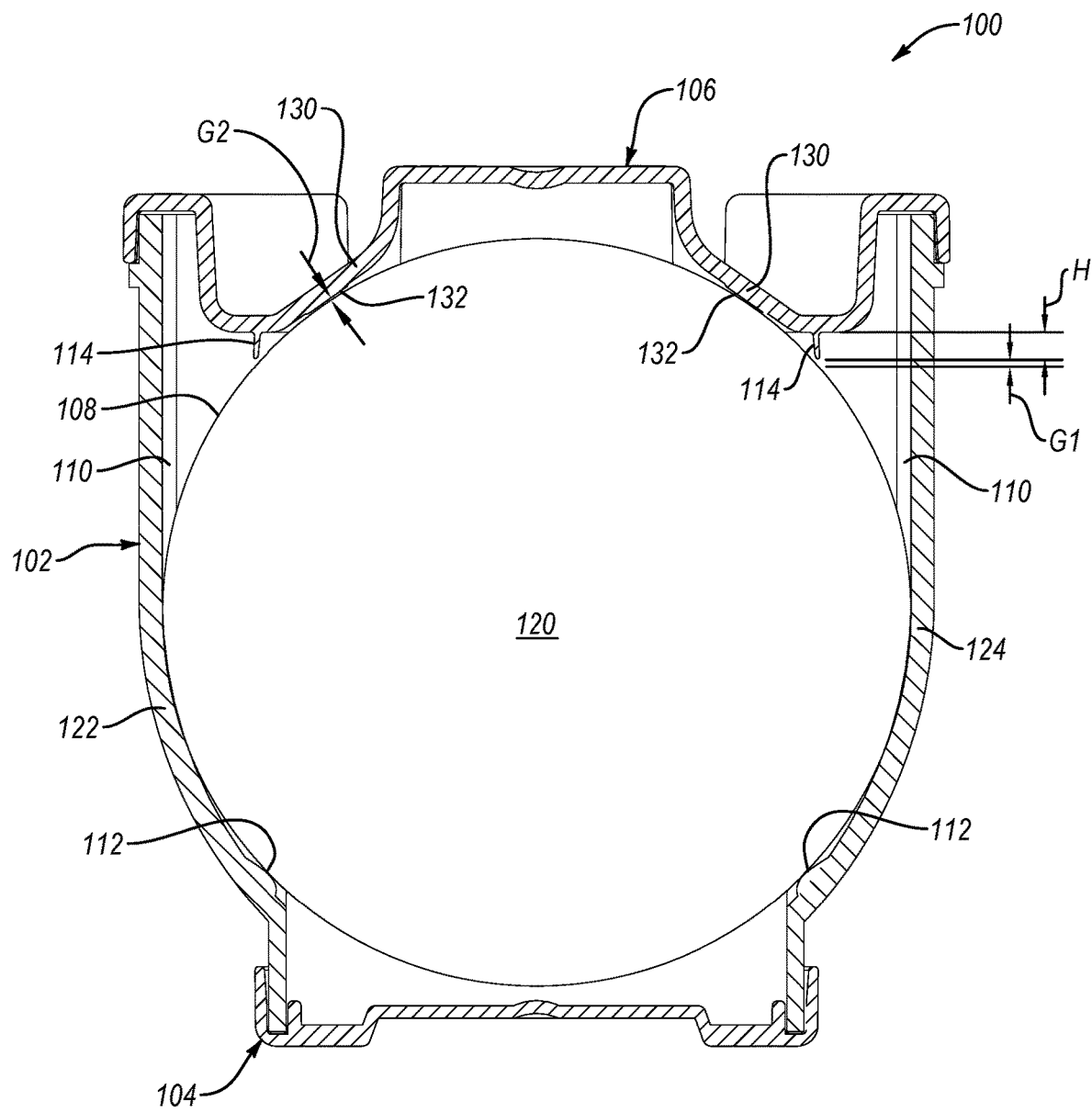
FIG. 5 is a cross-sectional side elevation view of the container of FIG. 1, taken along the line 3-3 of FIG. 1 and shown with HDD media stored in the container, according to one or more examples of the present disclosure.

Referring to FIG. 5, after the top lid 106 is fully coupled with the cassette 102 and the HDD media 108 is supported on the pads 112, but before the container 100 is shrink-wrapped, the height H of the fins 114 is such that an unoccupied gap G1 or space is defined between the fins 114 and the HDD media 108. In one example, the height H of each fin 114 is about 3.5 mm. Accordingly, before the container 100 is shrink-wrapped, the fins 114 do not contact the HDD media 108, supported on the pads 112, before, during, or after the top lid 106 is coupled to the cassette 102. Such a configuration helps to eliminate abrasion between the fins 114 of the top lid 106 and the HDD media 108 during a time when retention of the HDD media 108 is not needed for shipping or handling, such as while the top lid 106 is coupled to or decoupled from the cassette 102.

In some examples, the top lid 106 additionally includes vertical-containment walls 130 to help further constrain upward vertical movement of the HDD media 108 when contained within the cassette 102 and after the container 100 is shrink-wrapped. The vertical-containment walls 130 are located on opposite sides of the top lid 106 so as to be aligned with opposite sides of the HDD media 108. The vertical-containment walls 130 extends lengthwise along the top lid 106. Accordingly, each one of the vertical-containment walls 130 transverses multiple slots 111 of the cassette 102 when the top lid 106 is coupled to the cassette 102. Moreover, each vertical-containment wall 130 includes a vertical-containment surface 132 facing the media storage space 120. Each vertical-containment surface 132 is flat in some examples to help ensure a single point of contact with the HDD media 108. In other examples, each vertical-containment surface 132 is contoured or curved to match the contour or curvature of the outer edge of the HDD media 108. The vertical-containment walls 130 and vertical-containment surfaces 132 are thus called because they constrain upward vertical movement of the HDD media 108 and not because they are oriented vertically. Rather, the vertical-containment walls 130 are angled with respect to horizontal when the container 100 is supported on a horizontal surface.

With the top lid 106 coupled to the cassette 102, the vertical-containment surfaces 132 are located a distance r from a center of the HDD media 108. Again referring to FIG. 5, after the top lid 106 is fully coupled with the cassette 102 and the HDD media 108 is supported on the pads 112, but before the container 100 is shrink-wrapped, the distance r is greater than a radius of the HDD media 108 such that that an unfilled gap G2 or space is defined between the vertical-containment surfaces 132 and the HDD media 108 (see, e.g., FIG. 5). In one particular example, the gap G2 is between about 0.2 mm and about 1.0 mm. Accordingly, before the container 100 is shrink-wrapped, the vertical-containment surface 132 of the vertical-containment walls 130 do not contact the HDD media 108, supported on the pads 112, before, during, or after the top lid 106 is coupled to the cassette 102. Such a configuration helps to eliminate abrasion between the vertical-containment walls 130 of the top lid 106 and the HDD media 108 during a time when retention of the HDD media 108 is not needed for shipping or handling, such as while the top lid 106 is coupled to or decoupled from the cassette 102.

Figure 6:
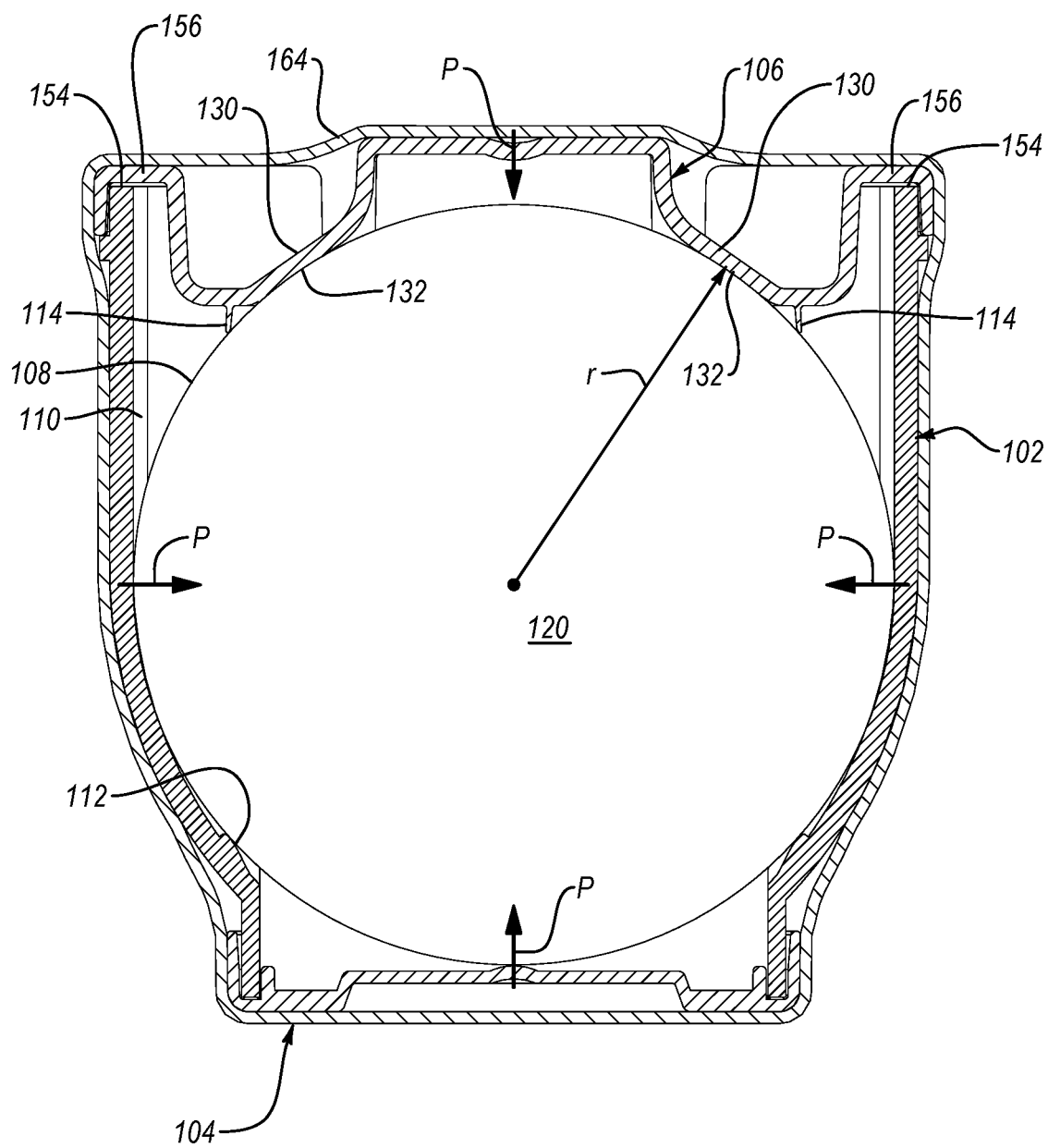
FIG. 6 is a cross-sectional side elevation view of the container of FIG. 1, taken along a line similar to the line 3-3 of FIG. 1, shown with HDD media stored in the container, and shrink-wrapped by a shrink-wrap material, according to one or more examples of the present disclosure.

Referring to FIG. 6, after the top lid 106 is coupled to the cassette 102 and prior to shipping, the entire container 100, with the HDD media 108 retained therein, is vacuum sealed using a shrink-wrapping or vacuum bagging method. Shrink-wrapping the container 100 includes wrapping a shrink-wrap material or bag around the container 100 and evacuating the pressure within the shrink-wrap material or bag (e.g., by using a vacuum pump) to tightly seal the material or bag against the container 100. Sealing the shrink-wrap material about the container 100 in this manner compresses the container 100 by applying compressive forces P to the container 100, which urges the bottom lid 104 and the top lid 106 to more tightly form against the cassette 102. Compression of the container 100 helps to stabilize or non-movably fix the bottom lid 104 and the top lid 106 to the cassette 102 for shipping. The shrink-wrap material or shrink film is made of a polymer plastic. In some implementations, the shrink-wrap material shrink-wraps about the container 100 via the application of heat, rather than the evacuation of pressure within the shrink-wrap material.

Compressing the container 100, via shrink-wrapping, brings the top lid 106 closer to the HDD media 108, decreases the gap G1, and urges the fins 114 into contact with the peripheral edge of the HDD media 108. In one particular example, the gap G1 is between about 0.2 mm and about 1.0 mm and shrink-wrapping the container 100 causes the top lid 106 to move more than between 0.2 mm and 1.0 mm closer to the HDD media 108, such that the gap G1 reduces to zero and the fins 114 flex against the HDD media 108. As mentioned above, contact with the HDD media 108 causes the fins 114 to resiliently flex and apply a biasing force to the HDD media 108. The biasing force helps to constrain upward vertical movement of HDD media 108 contained within the container 100 during shipping and handling of the container 100. In this manner, the fins 114 contact the HDD media 108 only when needed, which helps to reduce wear on the HDD media 108 being handled and shipped by the container 100. The top lid 106 includes one continuous fin 114 on each side of the top lid 106 that spans or transverses all the slots defined by the dividers 110 on the corresponding side of the cassette 102 in some examples. In other examples, the top lid 106 includes multiple fins 114 on each side of the top lid 106 with each fin 114 located to align with a corresponding one of the slots defined by the dividers 110.

Furthermore, compressing the container 100, via shrink-wrapping, reduces the distance r from the center of the HDD media 108, decreases the gap G2, and urges the vertical-containment surfaces 132 of the vertical-containment walls 130 into contact with the peripheral edge of the HDD media 108. In one particular example, the distance r is greater than the radius of the HDD media 108 by between about 0.2 mm and about 1.0 mm, such that the gap G2 is between about 0.2 mm and about 1.0 mm, and shrink-wrapping the container 100 causes the vertical-containment walls 130 to move just more than between 0.2 mm and 1.0 mm closer to the HDD media 108, such that the distance r is no more than the radius of the HDD media 108 and the gap G2 reduces to zero. Contact between the vertical-containment surfaces 132 and the peripheral edge of the HDD media 108 helps to constrain upward vertical movement of the HDD media 108 contained within the container 100 during shipping and handling of the container 100. Because the vertical-containment walls 130 contact the HDD media 108 only when needed, wear on the HDD media 108 being handled and shipped by the container 100 is reduced. The resiliently flexible fins 114 contact the peripheral edge of the HDD media 108 at a location that is different than (e.g., spaced apart from) the location at which the vertical-containment surfaces 132 contact the peripheral edge of the HDD media 108. Providing multiple points of contact on each side of the HDD media 108 by the top lid 106 helps to vertically secure the HDD media 108 better than with a single point of contact on each side of the HDD media 108.

Referring to FIG. 7, according to one example, a method 200 of shipping HDD media 108 is disclosed. The method 200 includes (block 202) locating HDD media 108 in a cassette 102 within slots 111, defined between a plurality of dividers 110 of the cassette 102, and on pads 112 of the cassette 102. The method 200 also includes (block 204) fully coupling a top lid 106 to the cassette 102 such that a gap G1 (e.g., a first gap) is defined between each one of resiliently flexible fins 114 of the top lid 106 and the HDD media 108 when the HDD media 108 is located on the pads 112 of the cassette 102. The method 200 additionally includes (block 206), with the top lid 106 fully coupled to the cassette 102, shrink-wrapping the cassette 102 and the top lid 106 with shrink-wrap material 164 to reduce the gaps between the resiliently flexible fins 114 of the top lid 106 and the HDD media 108 and urge the resiliently flexible fins 114 of the top lid 106 into contact with the HDD media 108.

In some examples, the cassette 102 and the top lid 106 are shrink-wrapped by enveloping the cassette 102 and the top lid 106 with the shrink-wrap material 164 and reducing a pressure within the shrink-wrap material 164 by at least 10% to 15%. According to certain examples of the method 200, fully coupling the top lid 106 to the cassette 102 further comprises fully coupling the top lid 106 to the cassette such that a second gap G2 is defined between each one of vertical-containment walls 130 of the top lid 106 and the HDD media 108 when the HDD media 108 is located on the pads 112 of the cassette 102. Shrink-wrapping the cassette 102 and the top lid 106 reduces the second gap G2 and urges the vertical-containment walls 130 into contact with the HDD media 108.

According to certain examples, the method 200 includes coupling a bottom lid 104 to the cassette 102 and interlocking the top lid 106 and the bottom lid 104. Shrink-wrapping of the method 200 further comprises shrink-wrapping the cassette 102, the top lid 106, and the bottom lid 104 with shrink-wrap material 164.

Referring to FIG. 8, examples of a system 101 for shipping HDD media 108 are disclosed. The system 101 includes a plurality of cassettes, including a first cassette 102A, a second cassette 102B, and a third cassette 102C. Each one of the first cassette 102A, the second cassette 102B, and the third cassette 102C includes features that are generally analogous to the features of the cassette 102. However, the first cassette 102A, the second cassette 102B, and the third cassette 102C are configured differently from each other as will be described in more detail.

Also included in the system 101 is the top lid 106 and the bottom lid 104. The top lid 106 is interchangeably coupleable to each one of the first cassette 102A, the second cassette 102B, and the third cassette 102C to cover the corresponding top opening 160 of the first cassette 102A, the second cassette 102B, and the third cassette 102C. Similarly, the bottom lid 104 is interchangeably coupleable to each one of the first cassette 102A, the second cassette 102B, and the third cassette 102C to cover the corresponding bottom opening 162 of the first cassette 102A, the second cassette 102B, and the third cassette 102C. The size and shape of the uppermost rim 154 of the multiple cassettes of the system 101 is the same, which allows the cassette engagement recess 156 of the top lid 106 to be compatible for coupling to each of the multiple cassettes. Similarly, a bottommost rim of the multiple cassettes of the system 101 can be the same to allow the bottom lid 104 to be compatible for coupling to each of the multiple cassettes.

Because the top lid 106 does not include lateral-movement-constraining features, such as teeth, the top lid 106 can be used with any of various cassettes having any of various HDD media 108 containment configurations. More specifically, because the top lid 106 does not include lateral-movement-constraining features, there are no lateral-movement-constraining features that would obstruct HDD media 108 spatially arranged in the cassette in a manner that is incompatible with the spatial arrangement of lateral-movement-constraining features. Accordingly, HDD media 108 can be spatially arranged in any of various configurations and still be compatible with use of the top lid 106. The spatial arrangement of HDD media 108 is different for each of the multiple cassettes of the system 101.

The different spatial arrangement of HDD media 108 is governed by different configurations of the slots 111 in the different cassettes. For example, the slots 111 of one cassette of the system 101 can be configured differently by having a different size than another cassette of the system 101. As another example, the slots 111 of one cassette of the system 101 can be configured differently by having a different number of slots 111 (e.g., spaced further apart) than another cassette of the system 101. Referring to FIG. 8, in one example, the slots 111A of the first cassette 102A, while having the same size (e.g., same width, which in one example is 0.635 mm) as the slots 111B of the second cassette 102B (to accommodate the same-sized HDD media 108), are spaced closer together than the slots 111B of the second cassette 102B (to accommodate more HDD media 108 in one container). Accordingly, the first cassette 102A has more slots 111A (e.g., 50) than the second cassette 102B (e.g., 25). Again, referring to FIG. 8, in an example, the slots 111C of the third cassette 102C are wider than the slots 111A of the first cassette 102A (to accommodate differently-sized HDD media 108, such as 1.27 mm width HDD media). Because the size of the slots 111C is wider than the slots 111A, in some examples, the third cassette 102C also has fewer slots than the first cassette 102A. The system 101 can have any number of differently-configured cassettes each with a different configuration of slots.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of"

means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A container for shipping disk-shaped articles, the container comprising:
   a cassette comprising:
      a top opening;
      a plurality of dividers that define slots therebetween for receiving the disk-shaped articles and constraining lateral movement of the disk-shaped articles; and
      pads for supporting the disk-shaped articles and constraining downward vertical movement of the disk-shaped articles; and
   a top lid coupleable to the cassette over the top opening and comprising resiliently flexible fins, wherein:
      when the top lid is fully coupled to the cassette, the disk-shaped articles are supported on the pads, and the container is not shrink-wrapped, an unoccupied gap is defined between the resiliently flexible fins and the disk-shaped articles; and
      when the top lid is fully coupled to the cassette, the disk-shaped articles are supported on the pads, and the container is shrink-wrapped, the resiliently flexible fins contact and are flexed against the disk-shaped articles.

2. The container according to claim 1, wherein the resiliently flexible fins comprise a first resiliently flexible fin aligned with a first side of the disk-shaped articles received in the cassette and a second resiliently flexible fin aligned with a second side, opposite the first side, of the disk-shaped articles received in the cassette.

3. The container according to claim 1, wherein, when the top lid is coupled to the cassette, each one of the resiliently flexible fins transverses multiple ones of the slots.

4. The container according to claim 1, wherein the unoccupied gap has a thickness between 0.2 mm and 1.0 mm.

5. The container according to claim 1, wherein:
   the cassette further comprises a bottom opening;
   the container further comprises a bottom lid coupleable to the cassette over the bottom opening; and
   when the top lid and the bottom lid are coupled to the cassette, the bottom lid is interlockable with the top lid.

6. The container according to claim 5, wherein the top lid is fully coupled to the cassette when the bottom lid is coupled to the cassette, the top lid is coupled to the cassette, and the bottom lid and the top lid are interlocked.

7. The container according to claim 1, wherein:
   the top lid further comprises vertical-containment walls;
   when the top lid is fully coupled to the cassette, the disk-shaped articles are supported on the pads, and the container is not shrink-wrapped, a second unoccupied gap is defined between the vertical-containment walls and the disk-shaped articles; and
   when the top lid is fully coupled to the cassette, the disk-shaped articles are supported on the pads, and the container is shrink-wrapped, the vertical-containment walls contact the disk-shaped articles.

8. The container according to claim 7, wherein the vertical-containment walls comprise a first vertical-containment wall aligned with a first side of the disk-shaped articles received in the cassette and a second vertical-containment wall aligned with a second side, opposite the first side, of the disk-shaped articles received in the cassette.

9. The container according to claim 7, wherein, when the top lid is coupled to the cassette, each one of vertical-containment walls transverses multiple ones of the slots.

10. The container according to claim 7, wherein the second unoccupied gap has a thickness between 0.2 mm and 1.0 mm.

11. The container according to claim 1, wherein the top lid does not constrain lateral movement of the disk-shaped articles.

12. A method of shipping disk-shaped articles, the method comprising:

locating disk-shaped articles in a cassette within slots, defined between a plurality of dividers of the cassette, and on pads of the cassette, wherein the cassette comprises:
a top opening;
the plurality of dividers define the slots therebetween for receiving the disk-shaped articles and constraining lateral movement of the disk-shaped articles; and
the pads for supporting the disk-shaped articles and constraining downward vertical movement of the disk-shaped articles;
fully coupling a top lid to the cassette such that an unoccupied gap is defined between each one of resiliently flexible fins of the top lid and the disk-shaped articles when the disk-shaped articles are located on the pads of the cassette, wherein:
the top lid is coupleable to the cassette over the top openings and comprises the resiliently flexible fins;
when the top lid is fully coupled to the cassette, the disk-shaped articles are supported on the pads, and the container is not shrink-wrapped, the unoccupied gap is defined between the resiliently flexible fins and the disk-shaped articles; and
when the top lid is fully coupled to the cassette, the disk-shaped articles are supported on the pads, and the container is shrink-wrapped, the resiliently flexible fins contact and are flexed against the disk-shaped articles; and
with the top lid fully coupled to the cassette, shrink-wrapping the cassette and the top lid with shrink-wrap material to reduce the unoccupied gap and urge the resiliently flexible fins of the top lid into contact with the disk-shaped articles.

13. The method according to claim 12, wherein shrink-wrapping the cassette and the top lid comprises:
enveloping the cassette and the top lid with the shrink-wrap material; and
reducing a pressure within the shrink-wrap material by at least 10% to 15%.

14. The method according to claim 12, wherein:
fully coupling the top lid to the cassette further comprises fully coupling the top lid to the cassette such that a second gap is defined between each one of vertical-containment walls of the top lid and the disk-shaped articles when the disk-shaped articles are located on the pads of the cassette; and
shrink-wrapping the cassette and the top lid reduces the second gap and urges the vertical-containment walls into contact with the disk-shaped articles.

15. The method according to claim 12, further comprising:
coupling a bottom lid to the cassette; and
interlocking the top lid and the bottom lid;
wherein shrink-wrapping further comprises shrink-wrapping the cassette, the top lid, and the bottom lid with shrink-wrap material.

16. The method according to claim 12, further comprising:
removing the shrink-wrap material from the cassette and the top lid;
decoupling the top lid from the cassette;
locating second disk-shaped articles in a second cassette within second slots, defined between a plurality of second dividers of the second cassette, and on second pads of the second cassette, where the second cassette is configured differently than the cassette;
fully coupling the top lid to the second cassette such that a second gap is defined between each one of resiliently flexible fins of the top lid and the second disk-shaped articles when the second disk-shaped articles are located on the second pads of the second cassette; and
with the top lid fully coupled to the second cassette, shrink-wrapping the second cassette and the top lid with shrink-wrap material to reduce the second gap and urge the resiliently flexible fins of the top lid into contact with the second disk-shaped articles.

17. The method according to claim 16, wherein at least one of:
the size of the second slots is different than that of the slots; or
the number of second slots is different than that of the slots.

18. A system for shipping disk-shaped articles, the system comprising:
a plurality of cassettes, each comprising:
a top opening;
a plurality of dividers that define slots therebetween for receiving the disk-shaped articles and constraining lateral movement of the disk-shaped articles; and
pads for supporting the disk-shaped articles and constraining downward vertical movement of the disk-shaped articles;
wherein each one of the plurality of cassettes is configured differently than any other of the plurality of cassettes;
a top lid interchangeably coupleable to each one of the plurality of cassettes over the top opening and comprising resiliently flexible fins, wherein:
when the top lid is fully coupled to any one of the plurality of cassettes, the disk-shaped articles are supported on the pads, and the container is not shrink-wrapped, an unoccupied gap is defined between the resiliently flexible fins and the disk-shaped articles; and
when the top lid is fully coupled to any one of the cassettes, the disk-shaped articles are supported on the pads, and the container is shrink-wrapped, the resiliently flexible fins contact and are flexed against the disk-shaped articles.

19. The system according to claim 18, wherein at least one of:
a size of the slots of any one of the plurality of cassettes is different than the size of the slots of any other of the plurality of cassettes; or
a total number of the slots of any one of the plurality of cassettes is different than the total number of the slots of any other of the plurality of cassettes.

20. The system according to claim 18, further comprising a bottom lid, wherein:
each one of the plurality of cassettes further comprises a bottom opening;
the bottom lid is interchangeably coupleable to each one of the plurality of cassettes over the bottom opening; and
when the top lid and the bottom lid are coupled to a same one of the plurality of cassettes, the bottom lid is interlockable with the top lid.

\* \* \* \* \*